(12) United States Patent
Jones et al.

(10) Patent No.: US 12,737,307 B2
(45) Date of Patent: Sep. 15, 2026

(54) SYSTEMS AND METHODS FOR MOVING DATA BETWEEN A STORAGE DEVICE AND A PROCESSING ELEMENT

(71) Applicant: Samsung Electronics Co., Ltd., Suwon-si (KR)

(72) Inventors: Marc Timothy Jones, Longmont, CO (US); Daniel Lee Helmick, Thornton, CO (US)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 18/385,319

(22) Filed: Oct. 30, 2023

(65) Prior Publication Data

US 2025/0086124 A1 Mar. 13, 2025

Related U.S. Application Data

(60) Provisional application No. 63/537,107, filed on Sep. 7, 2023.

(51) Int. Cl.

| | |
|---|---|
| ***G06F 13/16*** | (2006.01) |
| ***G06F 13/12*** | (2006.01) |
| ***G06F 13/40*** | (2006.01) |

(52) U.S. Cl.
CPC ........ *G06F 13/1642* (2013.01); *G06F 13/128* (2013.01); *G06F 13/4022* (2013.01)

(58) Field of Classification Search
CPC ............... G06F 13/1642; G06F 13/128; G06F 13/4022; G06F 13/14; G06F 3/06; G06F 3/0604; G06F 3/0658; G06F 3/0659; G06F 2212/1016
See application file for complete search history.

(56) References Cited

U.S. PATENT DOCUMENTS

| | | | |
|---|---|---|---|
| 10,296,485 | B2 | 5/2019 | Aslam et al. |
| 10,423,568 | B2 | 9/2019 | Berman et al. |
| 10,489,881 | B2 | 11/2019 | Yang |
| 10,902,549 | B2 | 1/2021 | Xu |
| 10,909,012 | B2 | 2/2021 | Yang |

(Continued)

FOREIGN PATENT DOCUMENTS

| | | | |
|---|---|---|---|
| CN | 113741642 | A | 12/2021 |
| CN | 111258948 | B | 7/2022 |
| CN | 115098422 | A | 9/2022 |

*Primary Examiner* — Phong H Dang
(74) *Attorney, Agent, or Firm* — Womble Bond Dickinson (US) LLP

(57) ABSTRACT

Systems and methods for moving data between a storage device and a processing element are disclosed. The storage device may include: a non-volatile storage medium; a first interface for communicating with a computing device; and a second interface for communicating with a processing element over a data communications network. The processing element may include a processing circuit that is configured to: receive a first request from the computing device via the first interface, where the first request identifies a first memory address associated with the first memory; retrieve first data from the non-volatile storage medium based on the first request; and transmit the first data to the processing element via the second interface for storing the first data in the first memory based on the first memory address.

18 Claims, 11 Drawing Sheets

(56) References Cited

U.S. PATENT DOCUMENTS

| | | | | |
|---|---|---|---|---|
| 2006/0095718 | A1* | 5/2006 | Day | G06F 9/544 712/34 |
| 2013/0151747 | A1* | 6/2013 | Zhang | G06F 9/3881 710/310 |
| 2014/0082120 | A1* | 3/2014 | Ma | G06F 15/16 709/213 |
| 2016/0034418 | A1 | 2/2016 | Romem et al. | |
| 2016/0306553 | A1* | 10/2016 | Ellis | G06F 12/02 |
| 2018/0067877 | A1* | 3/2018 | Balkan | G06F 13/1642 |
| 2020/0201565 | A1* | 6/2020 | Walker | G06F 3/0683 |
| 2022/0137864 | A1* | 5/2022 | Lee | G06F 13/1663 711/154 |
| 2022/0150164 | A1 | 5/2022 | Berman et al. | |
| 2024/0220115 | A1* | 7/2024 | Blinzer | G06F 3/0659 |

* cited by examiner

SYSTEMS AND METHODS FOR MOVING DATA BETWEEN A STORAGE DEVICE AND A PROCESSING ELEMENT

CROSS-REFERENCE TO RELATED APPLICATION(S)

The present application claims priority to and the benefit of U.S. Provisional Application No. 63/537,107, filed Sep. 7, 2023, entitled "NVME DATA MOVEMENT FOR GPU PROCESSING," the entire content of which is incorporated herein by reference.

FIELD

One or more aspects of embodiments according to the present disclosure relate to storage devices, and more particularly to moving data between a storage device and a processing element.

BACKGROUND

The use of artificial intelligence (AI) has increased dramatically over the last few years. AI has become commonly used in domains such as image classification, speech recognition, media analytics, heath care, autonomous machines, smart assistants, and the like. Using AI often necessitates the use of large datasets and advanced algorithms that similarly necessitate efficient and cost-effective data processing solutions.

The above information disclosed in this Background section is only for enhancement of understanding of the background of the present disclosure, and therefore, it may contain information that does not form prior art.

SUMMARY

One or more embodiments of the present disclosure are directed to a storage device comprising: a non-volatile storage medium; a first interface for communicating with a computing device; a second interface for communicating with a processing element over a data communications network, the processing element including a first memory; and a processing circuit coupled to the first interface, the second interface, and the non-volatile storage medium. The processing circuit is configured to: receive a first request from the computing device via the first interface, the first request identifying a first memory address associated with the first memory; retrieve first data from the non-volatile storage medium based on the first request; and transmit the first data to the processing element via the second interface for storing the first data in the first memory based on the first memory address.

In some embodiments, the first interface is configured for communication with the computing device over a data communication bus.

In some embodiments, the second interface is configured for point-to-point communication with the processing element over the data communications network.

In some embodiments, the data communications network includes a switch for transmitting the first data to the processing element based on the first memory address.

In some embodiments, the processing element includes a graphics processing unit (GPU).

In some embodiments, the processing circuit is further configured to transmit the first data to the processing element based on identifying a condition associated with the first memory address.

In some embodiments, the storage device further comprises a second memory, and the processing circuit is further configured to: receive a second request from the computing device via the first interface; process second data based on the second request for generating processed second data; store the processed second data in the second memory; receive a third request from the computing device via the first interface, the third request identifying a second memory address associated with the second memory; and transmit the processed second data to the processing element via the second interface for storing the second data in the first memory based on the second memory address.

One or more embodiments of the present disclosure are also directed to a storage device comprising: a non-volatile storage medium; a memory; a first interface for communicating with a computing device; a second interface for communicating with a processing element over a data communications network; and a processing circuit coupled to the first interface, the second interface, the non-volatile storage medium, and the memory. The processing circuit is configured to: receive a first request from the computing device via the first interface, the first request identifying a memory address associated with the memory; retrieve data from the non-volatile storage medium based on the first request, and store the data in the memory based on the memory address; receive a second request from the processing element over the second interface, the second request identifying the memory address storing the data; and based on the second request, retrieve the data from the memory and transmit the data to the processing element over the data communications network.

In some embodiments, the memory is exposed to the data communications network via the second interface.

In some embodiments, the first request is a first read request and the second request is a second read request.

In some embodiments, the first interface is configured for communication with the computing device over a data communication bus.

In some embodiments, the second interface is configured for point-to-point communication with the processing element over the data communications network.

In some embodiments, the data communications network includes a switch for transmitting the data to the processing element based on the memory address.

In some embodiments, the processing element includes a graphics processing unit (GPU).

In some embodiments, the processing circuit is configured to transmit the second request in response to a third request received by the processing circuit from the computing device, wherein the third request is for performing a computation using the data.

One or more embodiments of the present disclosure are further directed to a method comprising: receiving a first request from a computing device via a first interface of a storage device, the first request identifying a first memory address associated with a first memory of a processing element; retrieving first data from a non-volatile storage medium of the storage device based on the first request; and transmitting the first data to the processing element via a second interface of the storage device, for storing the first data in the first memory based on the first memory address.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
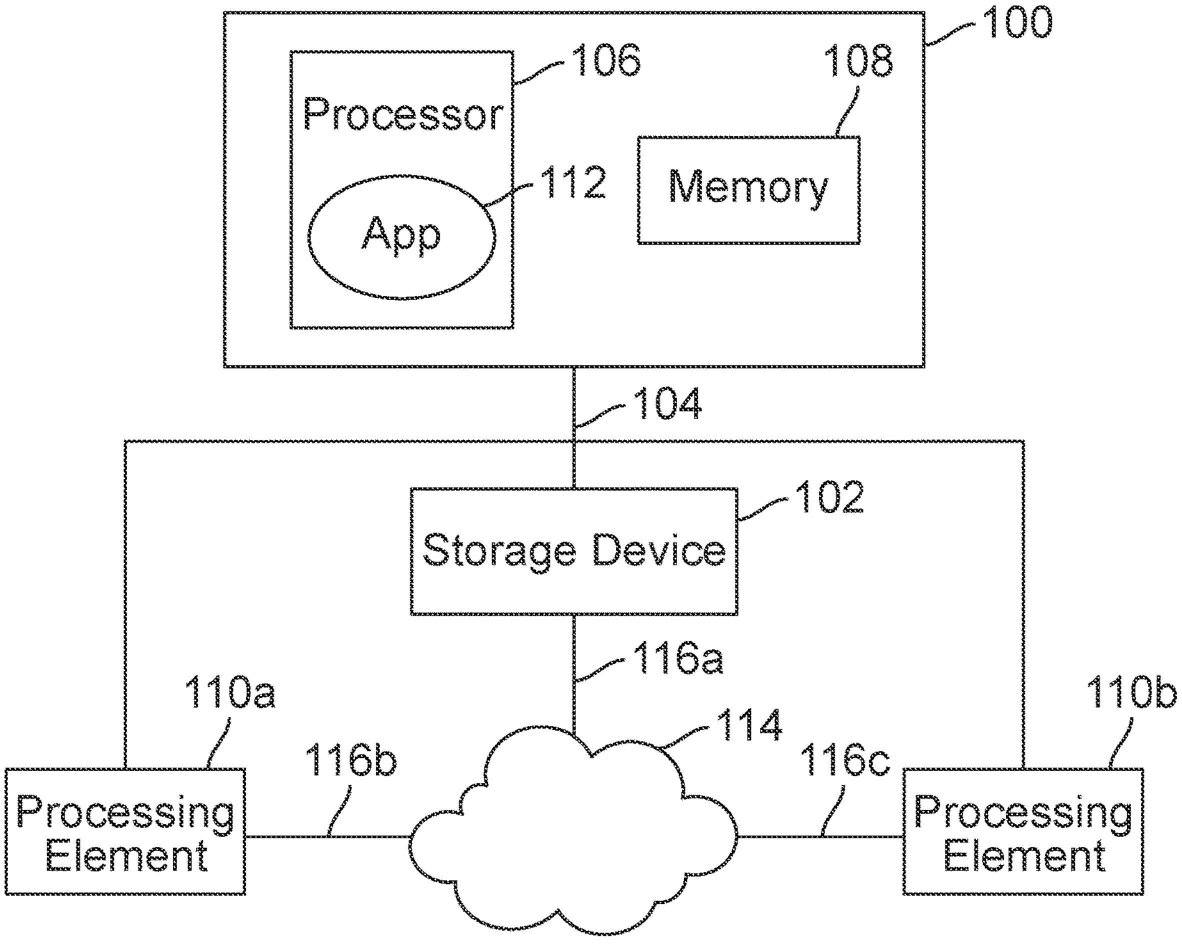
FIG. 1 depicts a block diagram of a computing environment according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

Machine learning (ML) systems may move large amount of data between a storage device and one or more processing devices. The data may include input vectors, weight vectors, and/or other ML data. The processing devices may be, for example, graphics processing units (GPUs) in a GPU network. Using a host central processing unit (CPU) to move the ML data to the GPU, however, may create latencies due to use of the CPU memory as an intermediate hop. For example, the host CPU may need to retrieve the ML data from the storage device and store the data to the CPU memory prior to transmitting the data to the GPU.

Other mechanisms may allow the transfer of the ML data to the GPU in a peer-to-peer (P2P) fashion over a Peripheral Component Interconnect Express (PCIe) interface. However, a P2P solution using PCIe may not work in some situations or with some devices. For example, some PCIe switches may not support P2P or inter-switch P2P (where both devices are attached to the same switch). PCIe switches that do support inter-switch P2P may also be performance limited due to the requirement of data passing through a host's chipset (e.g., root complex).

In general terms, embodiments of the present disclosure are directed to systems and methods for efficiently moving data stored in a storage device, to one or more processing elements (e.g., one or more GPUs). Although the various embodiments use the GPU as the example processing element, embodiments are not limited thereto, and may be expanded to other processing elements that may efficiently handle a processing task such as, for example, tensor processing units, co-processors, and/or the like.

In some embodiments, the processing elements are interconnected to one another over a data communications network such as, for example, over NVIDIA's NVLink mesh network, although embodiments are not limited thereto. The data communications network may allow the processing elements to communicate using a point-to-point connection where one processing element may connect with another processing element in a non-hierarchical way, enabling the processing element to relay information to another processing element (e.g., via a physical bridge) instead of routing it through a single node.

In some embodiments, the storage device that stores the data to be provided to the processing elements, includes a network interface to the network of processing elements, to move data between the storage device and a processing element in the network. The storage device further includes a host interface to a host computing device for receiving direct memory access (DMA) input/output (I/O) commands and other management commands from the host (e.g., over PCIe), and providing data in response to the commands.

In some embodiments, the host computing device transmits an I/O (e.g., a read or write) command to the storage device over the host interface. Using a read command as an example, the command may identify a target memory address of the processing element where the output of the data is to be stored. The storage device may retrieve the requested data and transmit the data to the processing element over the network interface. In this regard, the storage device may identify the target memory address as one that is associated with the network of processing elements. Thus, instead of returning the requested data to the host computing device as in a typical DMA process, and the host computing device forwarding the data to the processing element, the storage device may transmit the data to the processing element via the data communications network, by-passing the host computing device.

In some embodiments, the storage device exposes at least a portion of its memory to the processing network via the network interface. In this regard, the I/O command from the host interface may be processed, and the exposed memory of the storage device be used to store the results of the I/O command. The processing element may access the memory to read the stored data and perform a computation using the data.

FIG. 1 depicts a block diagram of a computing environment according to one or more embodiments. The computing environment includes a host computing device ("host") 100 coupled to a storage device 102 and to one or more processing elements 110*a*, 110*b* (collectively referenced as 110) over one or more data communication links (referred to as a host link) 104. In some embodiments, the host link 104 may facilitate communications (e.g., using a connector and a protocol) between the host 100 and the storage device 102 or processing element 110. In some embodiments, the host link 104 may facilitate the exchange of storage requests and responses between the host 100 and the storage device 102. In some embodiments, the host link 104 may facilitate data transfers of configuration and/or management commands between the host 100 and the storage device 102 or processing element 110. In various embodiments, the host link 104 (e.g., the connector and the protocol thereof) may include (or may conform to) a Compute Express Link (CXL), Cache Coherent Interconnect for Accelerators (CCIX), Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like. In other embodiments, the host link 104 (e.g., the connector and the protocol thereof) may include (or may conform to) various general-purpose interfaces, for example, such as Ethernet, Universal Serial Bus (USB), and/or the like.

The host 100 may include a processor 106 and a memory 108. The processor 106 may be a general purpose processor, such as, for example, a central processing unit (CPU) core of the host 100. The memory 108 may include, for example, a random access memory (RAM) (e.g., a dynamic random-access memory (DRAM)), read-only memory (ROM), and the like.

The processor 106 may be configured to run one or more applications 112 based on instructions stored in the memory 108. The application 112 may be any application configured to transmit requests (e.g., data access requests, program execution requests, etc.) to the processing element 110 and/or storage device 102. For example, the application 112 may be a big data analysis application, e-commerce application, database application, machine learning (ML) application, and/or the like.

In some embodiments, the application 112 includes one or more operations that may be desirable to be processed by the processing element 110. For example, the operation may be performing a computation based on data stored in the storage device 102. The computation may require a large amount of memory and/or computing resources. It may be desirable to have the processing element 110 perform the computation on behalf of the host 100, as the processing element may be equipped to perform the computation more efficiently than the host. The application 112 may control the computations that are to be performed by the processing element 110. The selected processing element 110 may perform the requested computation and transmit the results to the application 112. The results may be used by the application 112 to generate an output.

In some embodiments, the processing elements 110 are coupled to one another via a data communications network 114. In some embodiments, the data communications network 114 includes a mesh network such as, for example, NVIDIA's NVLink mesh network, although embodiments are not limited thereto. For example, the data communications network 114 may include one or more other networks including, but not limited to, a cellular network, a wide area network (WAN), and/or local area network (LAN).

In some embodiments, one or more of the processing elements 110 include a GPU, although embodiments are not limited thereto. For example, the processing elements 110 may include one or more tensor processing units, co-processors, combinations thereof, and/or the like. In some embodiments, the processing element 110 receives data associated with a processing task (e.g., a computation). The processing element 110 may process the data via a processing circuit and associated memory of the processing element, and return the results of the processing to the host 100, the storage device 102, and/or another processing element 110. If the results are to be returned to another processing element 110 (e.g., to perform further computations), the data communications network 114 may transfer the results from the source processing element 110 to the destination processing element (e.g., by-passing the host processor 106).

In some embodiments, the storage device 102 is a secondary memory device such as, for example, an SSD. In some embodiments, the storage device 102 is implemented as a computational storage device (for example, an SSD with an embedded processor or Field Programmable Gate Array (FPGA)). However, the present disclosure is not limited thereto, and in other embodiments, the storage device 102 may include (or may be) any suitable storage device, such as, for example, a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the storage device 102 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 102 may conform to any suitable or desired derivative of these form factors.

In some embodiments, the storage device 102 stores data that is used by the processing elements 110 for performing a computation. Taking an ML application as an example, the storage device 102 may store ML parameters, training/validation data, and/or the like. The storage device 102 may receive a command from the host 100 to move data from the storage device 102 to a processing element 110, for allowing the processing element to perform a computation using the data. The command from the host may be received over the host link 104 using, for example, the NVMe protocol. In some embodiments the host link 104 includes a PCIe bus. In this regard, the storage device 102 may behave like a traditional NVMe drive in its communication with the host 100. In addition to exchanging I/O data, the host link 104 may also be used for exchanging management and/or configuration data with the storage device 102 and the processing elements 110.

In some embodiments, the storage device 102 is further configured to communicate with the processing elements 110 over the data communications network 114. In this regard, the storage device 102 is coupled to the data communications network 114 via a second data communications link (referred to herein as a network link) 116*a*. The network link 116*a* may be similar to network links 116*b*, 116*c* used by the processing elements 110 for accessing the data communications network 114, and may collectively be referenced as network link 116.

In some embodiments, the storage device 102 uses the network link 116 to move data stored in the storage device 102, to the processing element 110, via the data communications network 114. For example, the storage device 102 may move the data via the data communications network 114 in a manner similar to how one processing element 110*a* may move data to another processing element 110*b* using the data communications network. In some embodiments, the network link 116 is a NVLink. NVLink may be similar to PCIe in that packets may be transmitted over the link to read and write memory. Using the network link 116 and the data communications network 114 to move data from the storage device 102 to the processing element 110 eliminates the need to pass through host memory 108 as an intermediate hop, allowing the transfer to be faster and more efficient.

Figure 2:
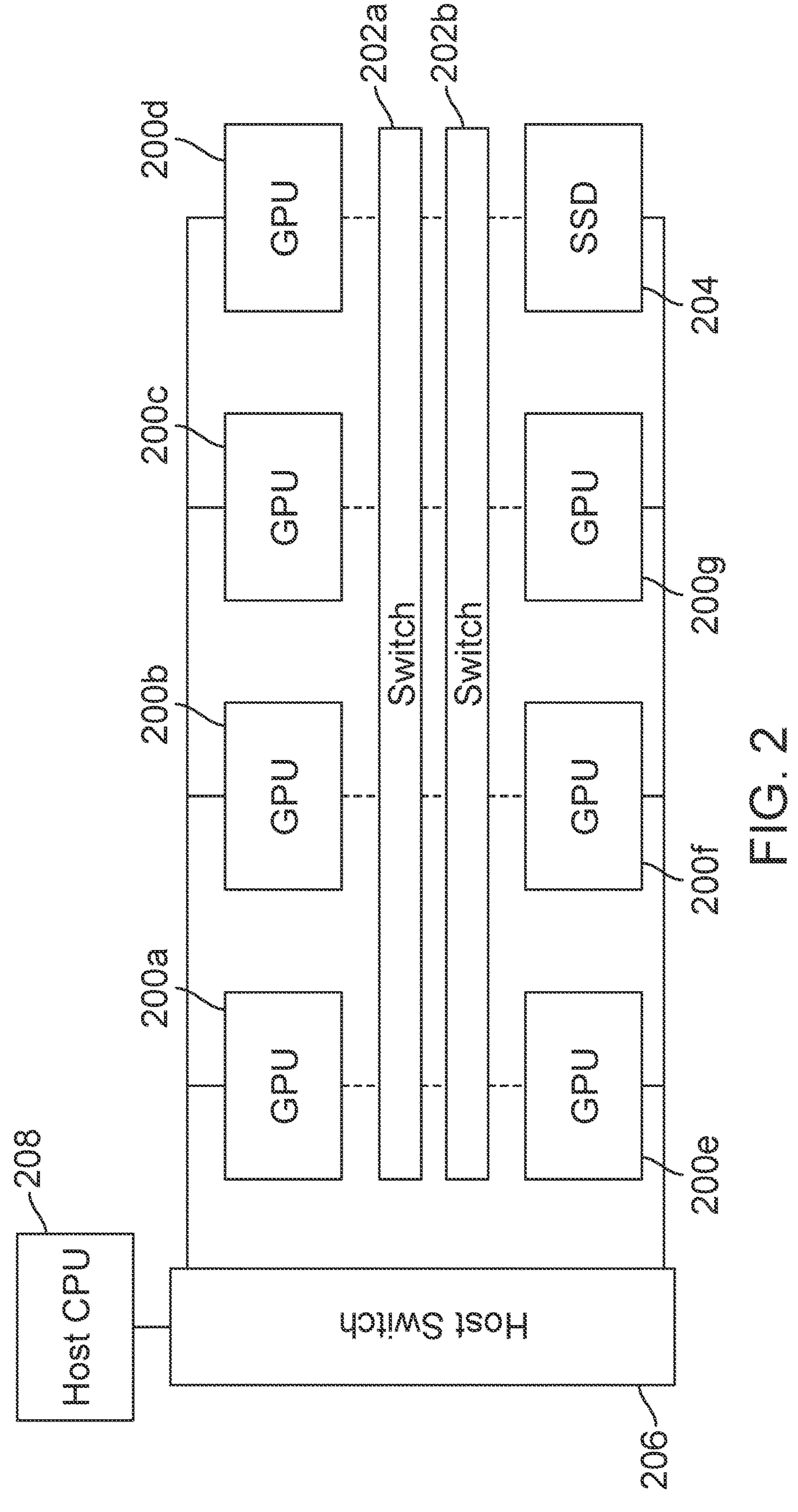
FIG. 2 depicts a block diagram of various processing elements coupled to one another over one or more switches and/or routers according to one or more embodiments.

FIG. 2 depicts a block diagram of various processing elements (e.g., GPUs) 200*a*-200*g* (collectively referenced as 200) coupled to one another over one or more switches and/or routers 202*a*-202*b* (collectively referenced as switch 202) according to one or more embodiments. In some embodiments, a storage device (e.g., an SSD) 204 is also coupled to the various processing elements 200 over the one or more switches 202. The processing elements 200 and the storage device 204 may respectively be similar to the processing elements 110 and the storage device 102 of FIG. 1.

In some embodiments, the switch 202 forms part of the data communications network 114 to facilitate the transfer of data to and from the processing elements 200. For example, the switch 202 may receive data transmitted by a source processing element 200 or the storage device 204, determine a destination for the data, and provide the data to the destination (e.g., a destination processing element 200). In some embodiments, the switch 202 includes NVIDIA's NVSwitch.

In some embodiments, the processing elements 200 and the storage device 204 are coupled to a host switch 206. The host switch 206 may be, for example, a PCIe switch, CXL switch, and/or the like. The host switch 206 may allow communication between a host CPU 208 (similar to the processor 106 of FIG. 1), and the data processing elements 200 and the storage device 204, via, for example, one or more PCIe lanes. The host switch 206 may use or be incorporated into the host link 104 of FIG. 1.

Management and I/O communication may be transmitted between the host 208 and the data processing elements 200 and the storage device 204 via the host switch 206. For example, the host CPU 208 may transmit configuration commands to the processing elements 200 and the storage device 204 via the host switch 206. The host CPU 208 may also use the host switch to transmit processing commands to the processing elements 200, such as, for example, commands to initiate processing of input data by a ML model. The host CPU 208 may further issue data storage requests (e.g., read and write requests) to the storage device 204 via the host switch 206.

Figure 3:
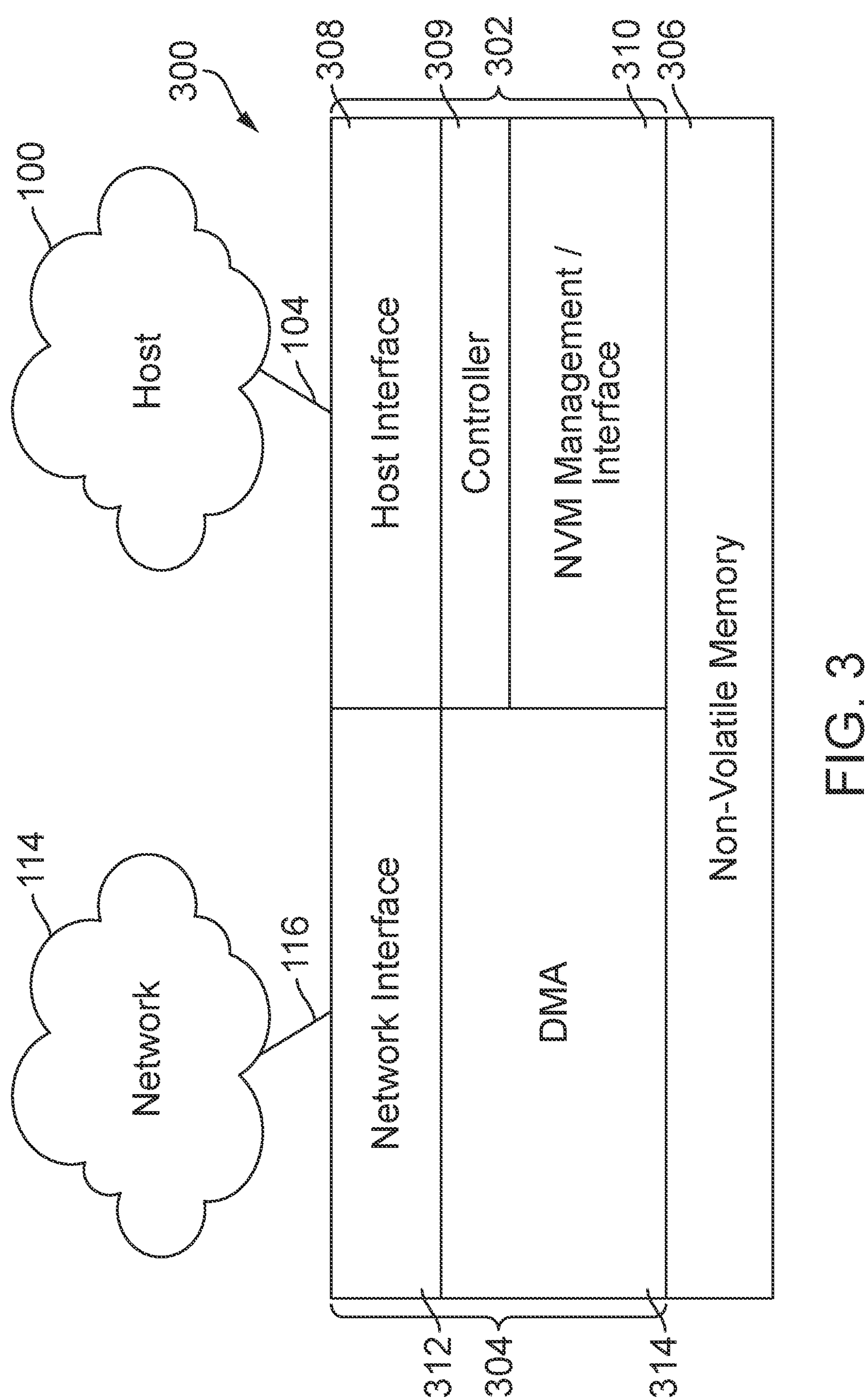
FIG. 3 depicts a block diagram of a storage device according to one or more embodiments.

FIG. 3 depicts a block diagram of a storage device 300 according to one or more embodiments. The storage device 300 may be similar to the storage device 102, 204 of FIGS. 1 and 2.

In some embodiments, the storage device 300 includes a first set of components 302 (including hardware and associated protocol) for interfacing with the host 100 over the host link 104 (and the host switch 206), and for interfacing with a non-volatile memory NVM 306. In some embodiments, the storage device 300 also includes a second set of components 304 (including hardware and associated protocol) for interfacing with the data communications network 114 via the network link 116. The NVM 306 that is also included in the storage device 300 may be used to persistently store data. The NVM 306 may include, for example, NAND flash memory, but the present disclosure is not limited thereto, and the NVM 306 may include any suitable kind of memory for persistently storing the data according to an implementation of the storage device 300 (e.g., magnetic disks, tape, optical disks, and/or the like).

Although not depicted in FIG. 3, in some embodiments, the storage device 300 may also include a local memory such as, for example, a DRAM (dynamic random access memory), SRAM (static random access memory), and/or DTCM (Data Tightly Coupled Memory).

The first set of components 302 may include, without limitation, a host interface 308, storage controller 309, and an NVM interface 310. The host interface 308 may include connections and/or an associated protocol for enabling communication with the host 100, such as, for example, Compute Express Link (CXL), Cache Coherent Interconnect for Accelerators (CCIX), Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like.

The storage controller 309 may be configured to manage communication with the host 100 (e.g., over the host interface 300), to process I/O and management commands from the host 100. The storage controller 309 may adhere to a storage access and transport protocol such as, for example, the NVMe protocol, although embodiments are not limited thereto. In some embodiments, the storage controller 309 is implemented via a processing circuit such as, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the NVM 306 according to the data access instructions.

Using NVMe as an example, the storage controller 309 may fetch an I/O command (e.g., read command) from a submission queue (e.g., in the host memory 108), and interface with the NVM interface 310 for performing the requested I/O operation. In the event of a traditional request for data that is not meant for the processing elements 110, the storage controller 309 performs a direct memory access to or from the host memory 108 to fulfill the request. For example, the storage controller 309 may fetch PRP or SGL entries from the host memory 108 (e.g., based on the target address in the I/O command) for fulfilling the I/O command. The PRP or SGL entries may describe physical memory locations of the host memory 108, for writing data read from the storage device 102 for a read command, or for reading data to be written to the storage device 102 for a write command. The storage controller 309 may also place a completion status in a corresponding completion queue (e.g., in the host memory 108) for indicating that the requested command has been completed.

In some embodiments, the NVM interface 310 is configured to manage the reading and writing of data from and to the NVM 306. In some embodiments, the NVM interface 310 includes a flash translation layer (FTL) that receives a data access request and interfaces with the NVM 306 to read data from, and write data to, the NVM. In this regard, the FTL may translate a disk or memory address included in the data access request, to a flash block address. Data may then be read or written into the translated flash block address.

According to some embodiments, the second set of components 304 include, without limitation, a network interface 312, and a direct memory access (DMA) engine 314. The network interface 312 may include connections and/or associated protocols for enabling data transfers to and from an address space of the processing elements 110 that is accessible via the data communications network 114 (hereinafter referred to as a network address space). In some embodiments, the network interface 312 is a memory transport that supports a direct memory access of the processing elements 110. For example, the network interface 312 may include a network port such as, for example, an NVLink port for accessing the data communication network 114 to perform data transfers to and from the network address space over an NVLink mesh network.

In some embodiments, the DMA engine 314 is configured to work with the storage controller 309 for processing an I/O request from the host 100. In some embodiments, the DMA engine 314 (e.g., the functionalities thereof) may be included into the storage controller 309. The storage controller 309 and DMA engine 314 may collectively be referred to as "controller."

In some embodiments, the DMA engine 312 is configured to determine whether a direct memory access to be performed in response to the I/O request, is to be conducted via the network interface 312 or the host interface 308. In this regard, the DMA engine 312 may examine a target address (which may be associated with a PRP or SGL list including multiple addresses) in the I/O request, and determine whether the target address is part of the host memory 108, or part of the network address space. If the address is part of the host memory 108, a memory access of the host memory is performed via the host interface 308, for reading or writing data based on the target address associated with the host memory. If the address is part of the network address space, a memory access of the network address space is performed via the network interface 312, for reading or writing data based on the target address associated with one of the processing elements 110.

In one example, the application 112 running on the host 100 issues a read request of data stored in the NVM 306. The read request may be received by the storage device 300 over the host interface 308. For example, the read request may be placed by the application 112 into the submission queue, and retrieved by the storage controller 309 for fulfilling the request. The read request may include a target address (e.g., a physical region page (PRP) address or a scatter-gather list (SGL) address) where the read data is to be stored. The read request may be for data to be used by the processing element 110 in performing a computation (e.g., an ML computation). In this case, the target address may be an address of one of the processing elements 110 instead of the host memory 108.

The DMA engine 314 may process the read request and determine that the target address is part of the network address space. The DMA engine 314 may transmit a write request to the network 114 via the network interface 312 to perform a write to the memory address of the appropriate processing element 110. In this regard, the network switch 202 in the data communications network 114 may route the write request to the appropriate processing element 110 based on the target address. For example, the network switch 202 may route the write request based upon a prior discovery of where the target address exists in the attached processing elements 110.

In some embodiments, the host processor 140 maintains a mapping of the network address space to the address space of the host 100. The mapping may be generated, for example, upon initialization of the host 100, via signaling over the host link 104. In this regard, during boot-time the host processor 106 may enumerate the devices (e.g., processing elements 110) attached to the interfaces (e.g., PCIe interfaces) that are attached to the host 100. The devices may be attached direct to the host, or attached through PCIe switches. The operating system of the host 100, upon boot-up, may scan the devices and map them into the host memory space (e.g., memory 108). Each device may expose a BAR (Base Address Register) which may inform the host how much address space is needed (and what its physical address will eventually be). The operating system may map the device's memory into its address space (e.g., 64-bit address space), along with other information, including device type. In this manner, the host 100 may know the addresses for the devices in the underlying system. For example, the host 100 may know that device #1 is processing element 110*a* with block of memory from address X to X+RegionSize, device #2 is processing element 110*b*, with block of memory from address Y to Y+RegionSize, and the like. Thus, when the host issues a read command to the storage device 102, the host may specify the address of the processing element 100 where the data is destined.

Based on the knowledge of the network address space, the application 112 may identify the memory address of the processing element 110 that is to perform a particular computation, and use the identified memory address as the target memory address for returning the result of a memory read request to the processing element. This may help avoid the additional step of storing the result of the memory read request in the host memory 108, to only forward the result to the processing element 110 for performing the computation.

In some embodiments, the host 100 identifies the target address in an I/O request as being mapped to the network address space or the host memory 108, by identifying a condition associated with the memory address. For example, one or more unused bits in the memory read request (hereinafter referred to as an identifier bit) may be used for indicating whether the target address is mapped to the network address space, or whether the target address is mapped to the host memory 108. For example, the identifier bit may be set if the target address is mapped to the network address space, and unset if the target address is mapped to the host memory 108 (or vice versa). The DMA engine 314 may determine whether the network interface 312 or the host interface 308 is to be used based on whether the identifier bit is set or unset.

In some embodiments, the host 100 provides to the storage device 102, a defined list of addresses and sizes that are part of the network address space. The defined list of addresses may be stored, for example, in memory (not shown) of the storage device 300. The DMA engine 314 may perform a compare of the received target address to the list of addresses in its memory, for determining the interface (e.g., network interface 312 or host interface 308) to be used for the memory access for fulfilling the I/O request.

Figure 4:
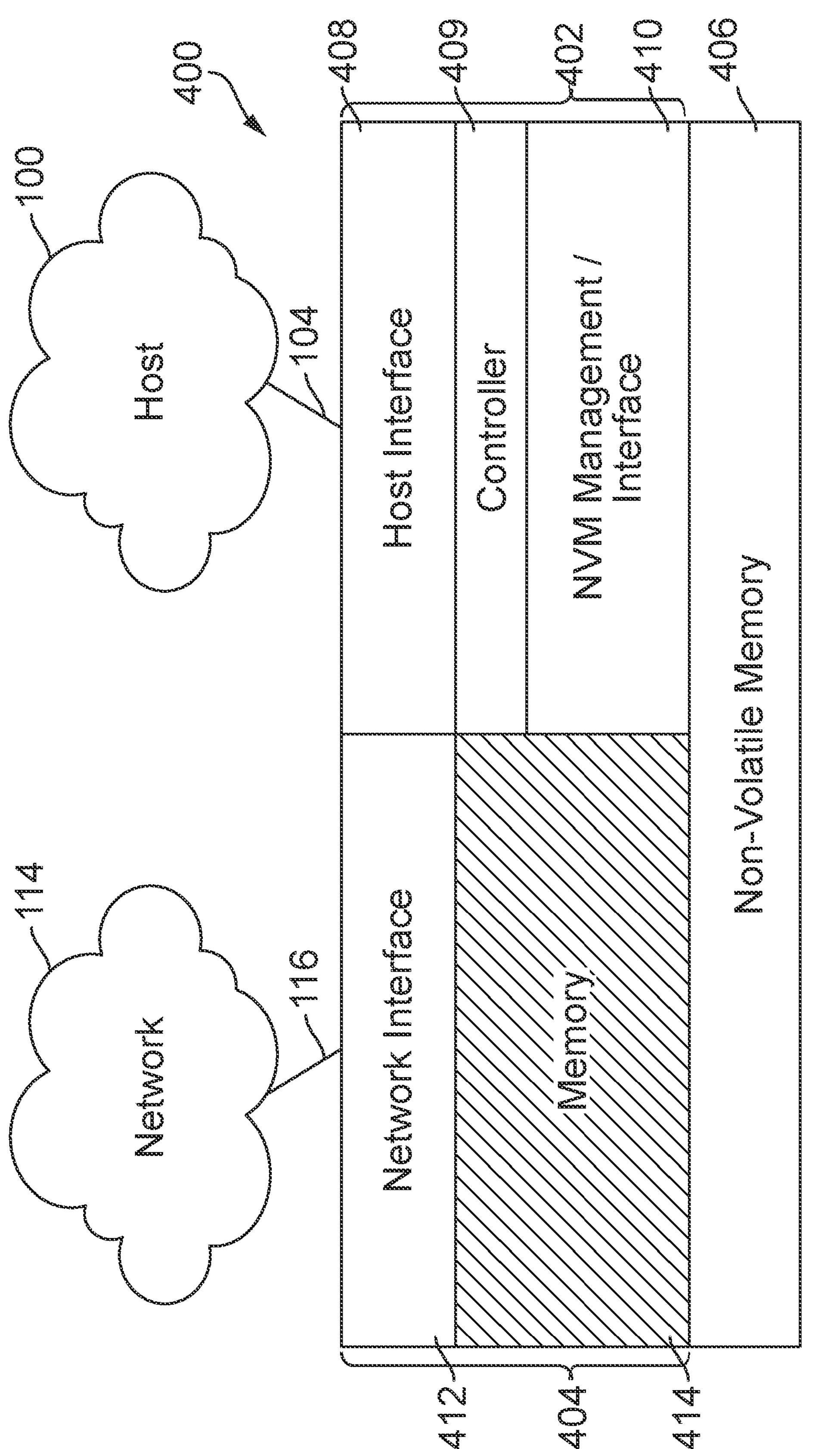
FIG. 4 depicts a block diagram of a storage device according to one or more embodiments.

FIG. 4 depicts a block diagram of a storage device 400 according to one or more embodiments. The storage device 400 may be similar to the storage device 102, 204 of FIGS. 1 and 2.

In some embodiments, the storage device 400 includes a first set of components 402 (including hardware and associated protocol) for interfacing with the host 100 over the host link 104 (and the host switch 206), and for interfacing with a non-volatile memory (NVM) 406. In some embodiments, the storage device 400 also includes a second set of components 404 (including hardware and associated protocol) for interfacing with the data communications network 114 via the network link 116. The NVM 406 is also included in the storage device 400, and may be used to persistently store data. The NVM 406 may be similar to the NMV 306 of FIG. 3.

The first set of components 402 may include, without limitation, a host interface 408, a storage controller 409, and an NVM interface 410. The first set of components 402 may be similar to the first set of components 302 of FIG. 3.

According to some embodiments, the second set of components 404 include, without limitation, a network interface 412 and a memory 414. The network interface 412 may be similar to the network interface 312 of FIG. 3, and may be used for enabling data transfers to and from the processing elements 110, over the data communications network 114.

The memory 414 may be, for example, part of the local memory of the storage device 400. In some embodiments, the memory 414 may include a DRAM, SRAM, and/or DTCM. The memory 414 may be exposed to the data communications network 114 over the network interface 412. The exposing of the memory 414 by the storage device 400 may be similar to the manner that a GPU exposes its memory to the NVswitch. The storage device 400 may respond to memory read and write requests from the network 114 similar to the manner that a processing element 110 may respond to the memory read and write requests from other processing elements. In this regard, the memory 414 may be mapped to (associated with) address values so that when an address is accessed by the processing element 110 (e.g., via a memory read or write command), it may refer to the memory 414 of the storage device 400.

In some embodiments, the memory 414 is populated by the host 100 or the processing element 110, via the host interface 408 (e.g., via a read command). The storage controller 409 may retrieve the data from the non-volatile memory 406 in response to the command, and store the data in the memory 414. In this regard, the target address included in the read command may be mapped to the memory 414 of the storage device 400 (e.g., instead of the host memory 108).

In some embodiments, the data stored in the memory 414 is accessed by the processing element 110 in response to receipt of a processing command from the host 100 (e.g., over the host link 104). The processing command may include, for example, the address where the data is stored in the memory 414. The processing element 110 may receive the processing command and transmit a request (e.g., a read request) to retrieve the data from the memory 414. The request from the processing element 110 may include, for example, the address where the data is stored in the memory 414. The network interface 412 may receive the request, and access the address in the memory 414 for retrieving the data. The retrieved data may be moved to a memory of the processing element via the data communication network 114. The processing element may use the data for performing a computation indicated by the processing command.

Figure 5:
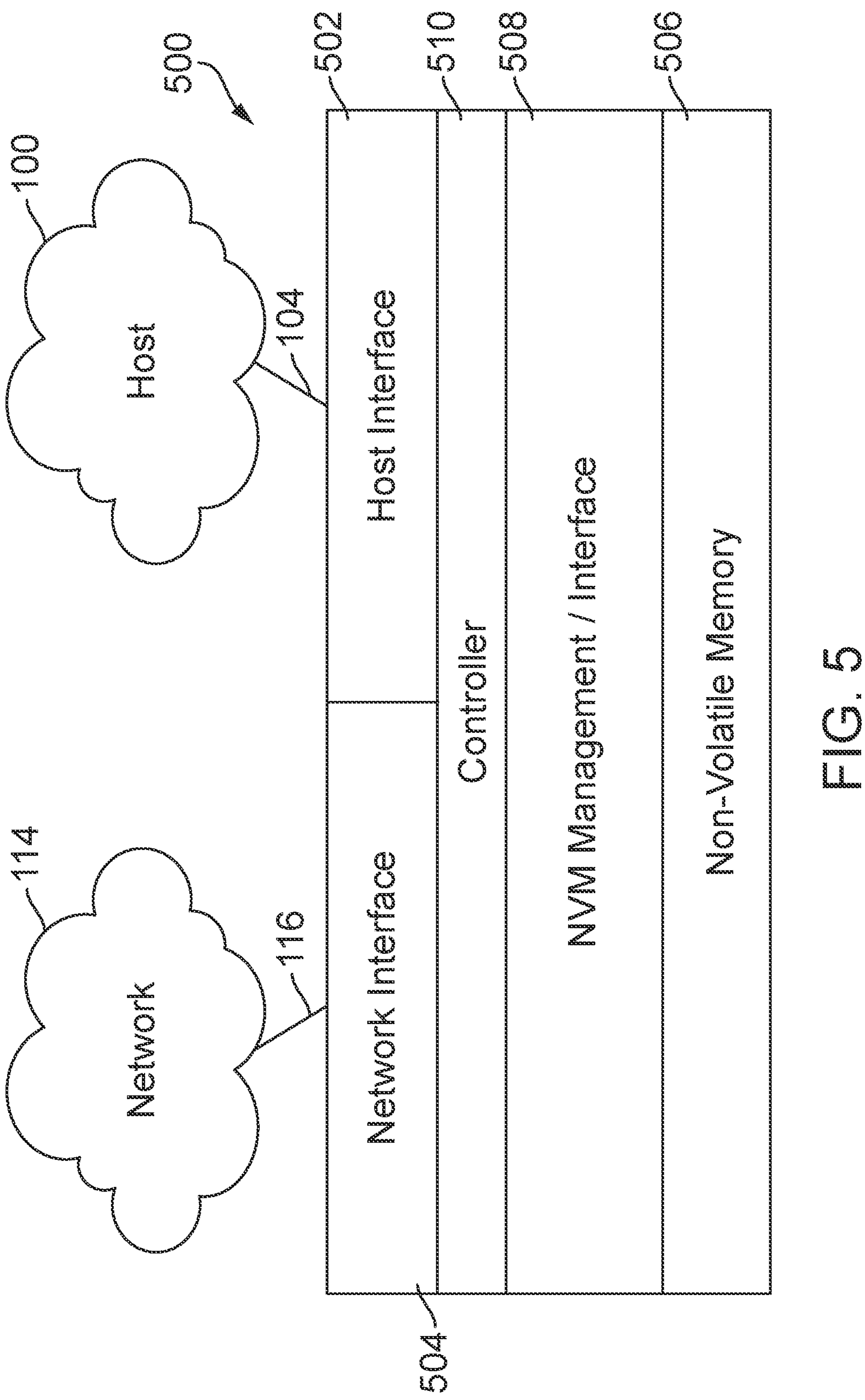
FIG. 5 depicts another block diagram of a storage device according to one or more embodiments.

FIG. 5 depicts a block diagram of a storage device 500 according to one or more embodiments. The storage device 500 may be similar to the storage device 102, 204 of FIGS. 1 and 2.

In some embodiments, the storage device 500 includes a host interface 502 for interfacing with the host 100 over the host link 104 (and the host switch 206). The host interface 502 may be similar to the host interface 308 of FIG. 3. For example, the host interface 502 may adhere to an interface standard such as, for example, PCIe.

In some embodiments, the storage device 500 also includes a network interface 504 (including hardware and associated protocol) for interfacing with the data communications network 114 via the network link 116. The network interface 504 may be similar to the network interface 312 of FIG. 3. For example, the network interface 504 may be used for enabling data transfers to and from the processing elements 110, over the data communications network 114.

The storage device 500 may further include a non-volatile memory (NVM) 506 for persistently storing data. The NVM 506 may be similar to the NMV 306 of FIG. 3. Access to, and management of, the NVM 506 may be by an NVM interface 508. The NVM interface 508 may be similar to the NVM interface 310 of FIG. 3.

In some embodiments, the storage device 500 includes a storage controller 510 that may be similar to the storage controller 309 of FIG. 3. The storage controller 510 may adhere to a storage access and transport protocol such as, for example, the NVMe protocol, although embodiments are not limited thereto.

In some embodiments, the storage controller 510 is configured to manage communication with the host 100 (e.g., over the host interface 104), for processing I/O and management commands from the host 100. In some embodiments, the storage controller 510 is also configured to manage communication with the processing elements 110 (e.g., over the data communications network 114), for processing I/O commands from the processing elements. For example, the processing elements 110 may be configured transmit the I/O commands using the storage access and transport protocol used with the host 100. Using the NVMe protocol as an example, the processing elements 110 may be configured to use the NVMe command set that is used by the host 100 (e.g., read, write, erase, etc.), for requesting access to the NVM 506. The I/O commands may be received by the network interface 504 and forwarded to the controller 510 for processing, similar to I/O commands received over the host interface 502.

In some embodiments, the processing elements 110 are configured with a processing element (PE) controller (not shown) configured to transmit the I/O commands and detect completion of the commands. In this regard, the PE controller may include a submission queue (PE SQ), completion queue (PE CQ), and/or administration queue (e.g., in the memory of the processing element 110), similar to the submission queue, completion queue, and/or administration queue in the host memory 108.

For example, the PE controller may submit a read or write command into the PE SQ. The read or write command may include target address(es) for fulfilling the read or write request. In some embodiments, the storage controller 510 may fetch the read or write command from the PE SQ, and fetch PRP or SGL entries from the PE memory (e.g., based on the target address(es) in the fetched command) for fulfilling the command. The PRP or SGL entries may describe physical memory locations of the PE memory, for writing data read from the NVM 506 for a read command, or for reading data to be written to the NVM for a write command. The storage controller 510 may further place a completion status in the corresponding PE CQ for indicating that the requested command has been completed.

In some embodiments, the PE controller is configured with all or only a subset of an I/O command set configured in the host processor 106. The limited I/O command set may allow the PE controller to initiate and control I/O accesses of the storage device 500. In this manner, the processing elements 110 may avoid orchestration of the accesses of the storage device 500 by the host processor 106, allowing autonomy of the processing elements 110.

Figure 6:
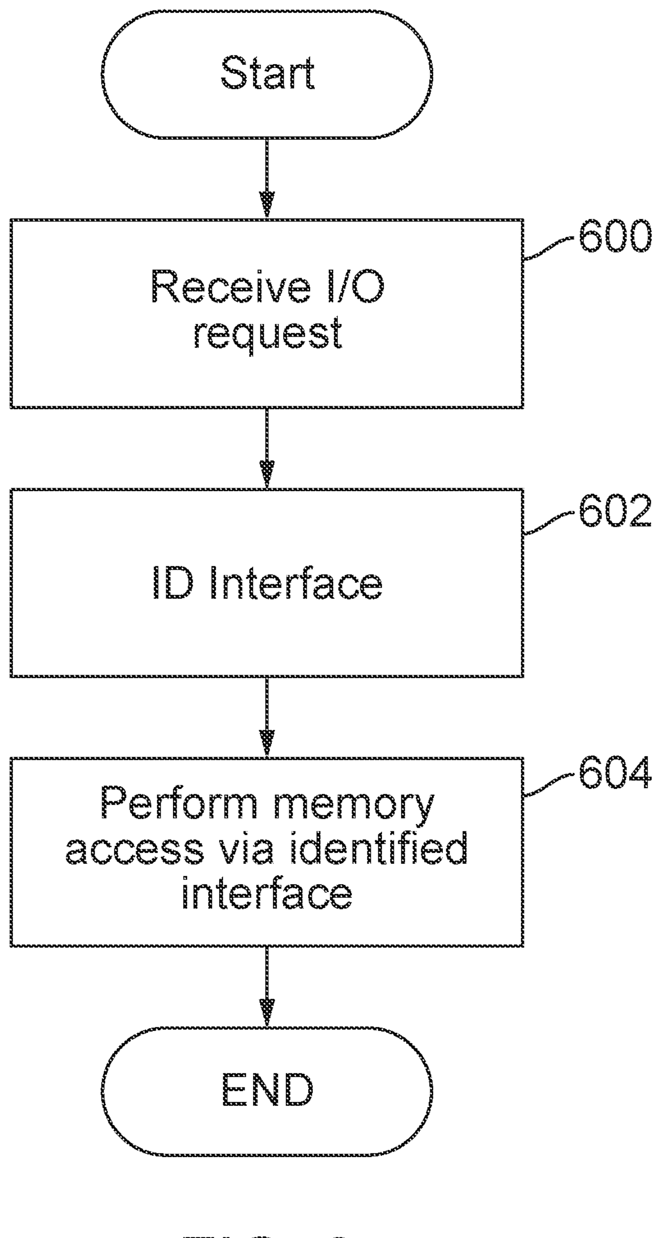
FIG. 6 depicts a flow diagram of a process for moving data stored in a storage device according to one or more embodiments.

FIG. 6 depicts a flow diagram of a process for moving data stored in the storage device 102 according to one or more embodiments. The process starts, and in act 600, the storage device 102 receives a request (e.g., an I/O request) from the host 100 over the host interface 308. In some embodiments, multiple requests may be received from multiple cores in the event that the host 100 is a multi-core host.

The storage controller 309 may process the request (e.g., retrieve the I/O request from a submission queue), and forward the request to the DMA engine 314.

In act 602, the DMA engine 314 identifies one of the host interface 308 or the network interface 312 for transferring data based on the I/O request. In this regard, the DMA engine 314 may identify the target address identified in the I/O request, and determine whether the target address is mapped to the network address space or the host memory 108, by identifying a condition. For example, the DMA engine 314 may examine the identifier bit in the I/O request for determining whether the bit is set or unset. For example, the identifier bit may be set if the target address is mapped to the network address space, and unset if the target address is mapped to the host memory 108 (or vice versa).

In some embodiments, the DMA engine 314 compares the target address to a list of addresses mapped to the data communication network 114, for identifying a match. In this regard, the host 100 provides to the storage device 102, a defined list of addresses and sizes that are part of the network address space. The defined list of addresses may be stored, for example, in memory (not shown) of the storage device 300. The DMA engine 314 may conclude that the target address is part of the network address space upon finding a match in the list of stored addresses.

In act 604, the storage controller 309 performs a memory access via the identified interface for fulfilling the I/O request. For example, if the I/O request is a read request, the storage controller may communicate with the NVM interface 310 for retrieving the requested data from the NVM 306. The storage controller 309 and/or DMA engine 314 may perform a memory access of the target address via the identified interface for returning the requested data to the target address. For example, if the target address is mapped to the host memory 108, the requested data may be returned to the host 100 via the host interface 308. The returned data may be stored in an address of the host 100 identified by one or more PRP/SGL entries.

If the target address is mapped to the network address space, the requested data may be returned to one of the processing elements 110 via the network interface 312. The network interface 312 may provide access to the mesh network for providing the data to the one of the processing elements 110, using a point-to-point connection. The network switch 202 in the data communications network 114 may route the request to the appropriate processing element 110 based on the target address. For example, the network switch 202 may route the write request based upon a prior discovery of where that address exists in the attached processing elements 110.

Figure 7:
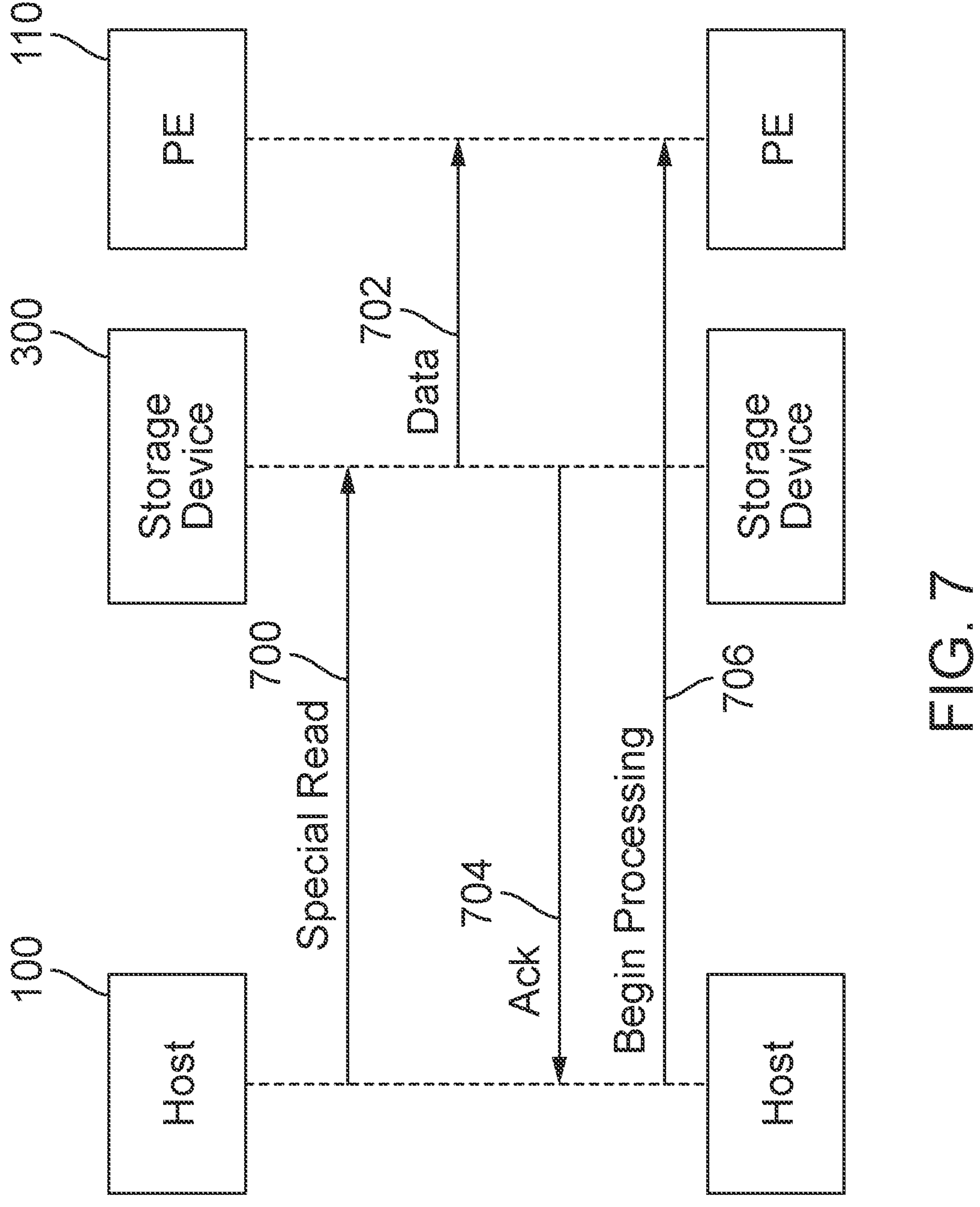
FIG. 7 depicts a signaling flow for moving data stored in a storage device to a processing element via a direct memory access, according to one or more embodiments.

FIG. 7 depicts a signaling flow for moving data stored in the storage device 300 to a processing element 110 via a direct memory access, according to one or more embodiments. In some embodiments, the host 100 initiates the movement by transmitting a read command or request 700 to the storage device 300. The read command 700 may be deemed to be a "special" read command in that instead of identifying a target memory address in the host 100 for returning the read data, the target memory address is in the processing element 110.

The storage device 300 may receive the read command 700 via the host interface 308. The storage controller 309 may process the read command 700 and retrieve the requested data from the NVM 306 via the NVM management interface 310.

In some embodiments the read command 700 (or at least a portion thereof) is further processed by the DMA engine 314. In this regard, the DMA engine 314 may examine the target memory address in the read command 700 and determine that the address is part of the network address space. For example, an identifier bit in the target memory address may identify the address as being in the network address space. In another example, the DMA engine 314 may compare the target address to a list of addresses stored in its memory, and determine that the target memory address is in the network address space upon find a match.

The retrieved data may be transmitted to the processing element 110 via a data packet 702. The data packet 702 may be generated, for example, by the network interface 312. The data packet may identify, among other things, the target address as the destination address. The target address may take the form of a PRP address or a SGL address based on the network address map. In some embodiments, the data packet 702 is transmitted to the data communication network 114 via the network interface 312. The data communications network 114 may route the data packet 702 to the processing element 110 based on the target address identified in the data packet.

Based on the transfer of the data over the data communication network 114 (e.g., without an indication of error messages), the storage device 300 may transmit an acknowledgement message 704 to the host 100. The acknowledgement message may be, for example, a completion message that is stored in a completion queue of the host 100. The completion message may be transmitted, for example, via the host interface 308. The completion message may indicate completion of the read command 700.

The acknowledgment message 704 may signal the host 100 that processing of the data may be performed by the processing element 110. In this regard, the host 100 may transmit a processing message 700 to the processing element 110 to begin processing of the data. In some embodiments, the processing message 704 includes the memory address of the processing element 110 storing the data that is the subject of the processing. The processing element 110 may perform a local read of the data at the memory address, and engage in the processing (e.g., a computation) using the data.

Figure 8:
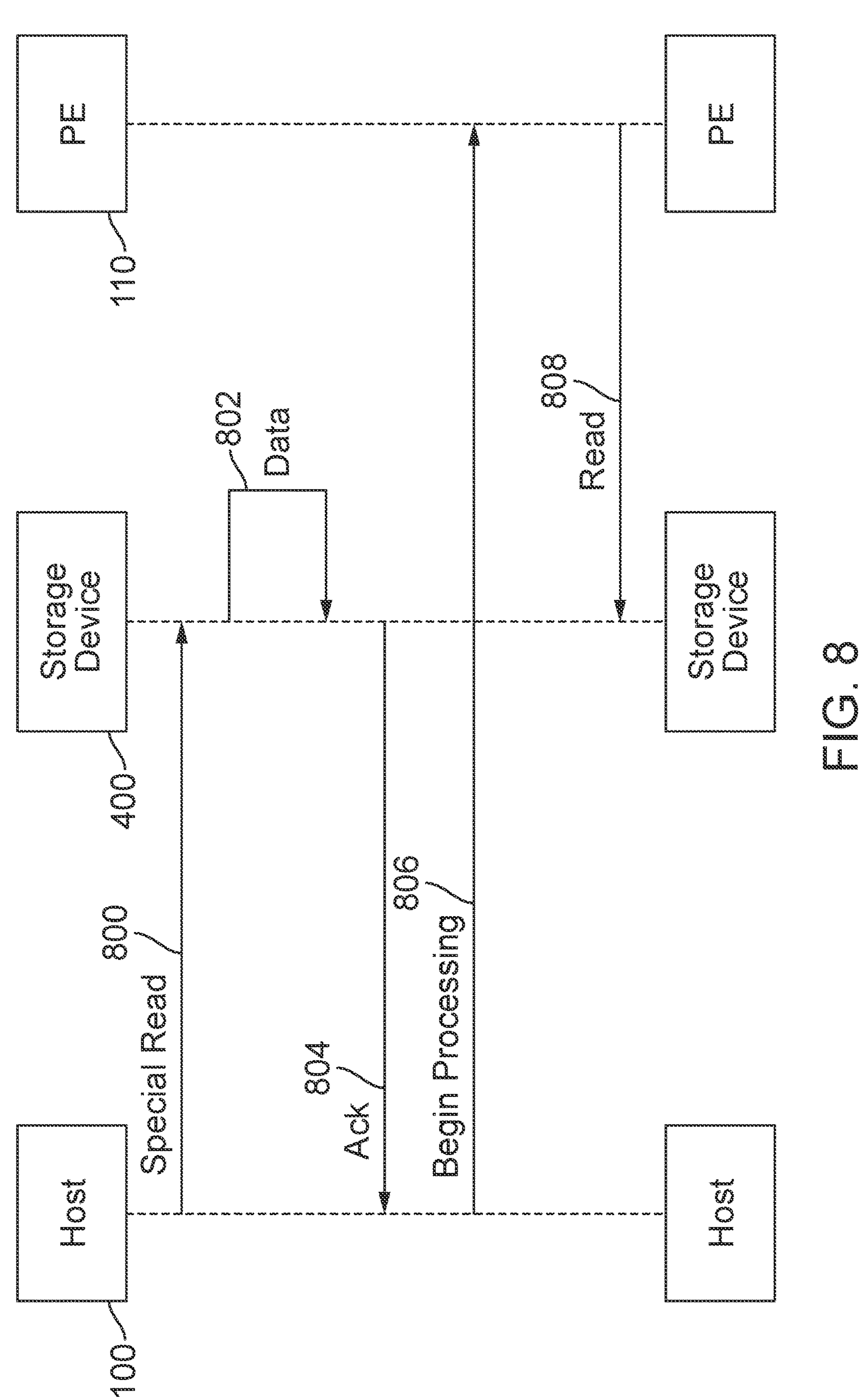
FIG. 8 depicts a signaling flow for moving data stored in a storage device to a processing element by exposing a memory of the storage device, according to one or more embodiments.

FIG. 8 depicts a signaling flow for moving data stored in the storage device 400 to a processing element 110 by exposing the memory 414 of the storage device, according to one or more embodiments. In some embodiments, the host 100 populates the memory 414 by transmitting a read command or request 800 to the storage device 400. The read command 800 may be deemed to be a "special" read command in that instead of identifying a target memory address in the host 100 for returning the read data, the target memory address is in the exposed memory 414 of the storage device 400.

The storage device 400 may receive the read command 800 via the host interface 408. The storage controller 409 may process the read command 800 and retrieve the requested data from the NVM 406 via the NMV management interface 410. The retried data may be stored in the target memory address of the exposed memory 414, as depicted via signal flow 802.

Based on the completion of the read command, the storage device 400 may transmit an acknowledgement message 804 to the host 100. The acknowledgement message may be, for example, a completion message that is stored in a completion queue of the host 100. The completion message may be transmitted, for example, via the host interface 408. The completion message may indicate completion of the read command.

The acknowledgment message 804 may signal the host 100 that processing of the data may be performed by the processing element 110. In this regard, the host 100 may transmit a processing message 806 to the processing element 110 to begin processing of the data. In some embodiments, the processing message 806 includes the memory address of the memory 414 storing the data that is the subject of the processing. In some embodiments, the processing element 110 performs a read 808 of the data at the memory address, and engages in the processing (e.g., a computation) using the data.

Figure 9:
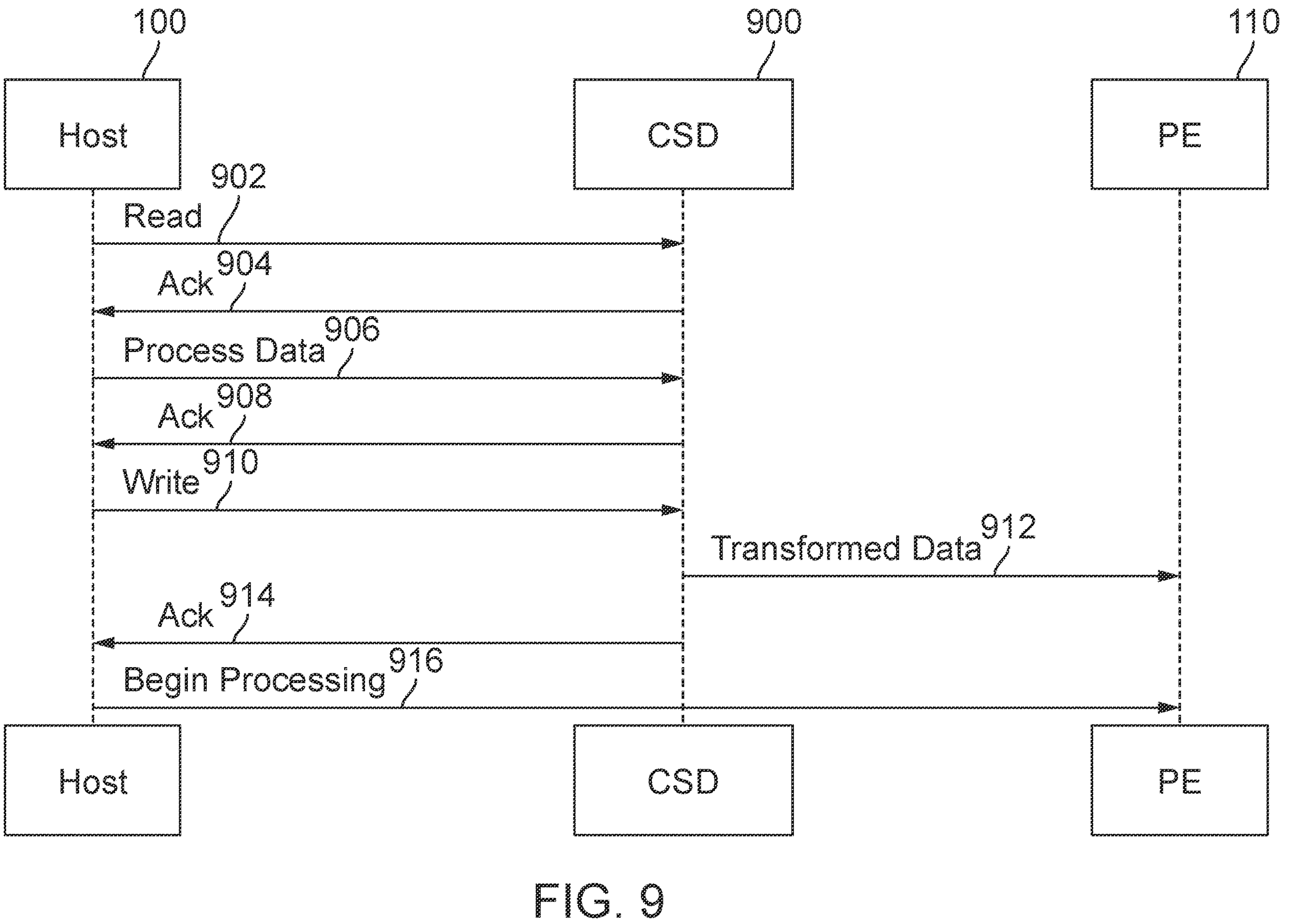
FIG. 9 depicts a signaling flow for moving data stored in a computational storage device according to one or more embodiments.

FIG. 9 depicts a signaling flow for moving data stored in a computational storage device (CSD) 900 according to one or more embodiments. The CSD 900 may be similar to the storage device 300 of FIG. 3, and may include an embedded processor or FPGA. The CSD 900 may also include a local memory, such as, for example, a shared local memory.

In some embodiments, data to be used by the processing element 110 for a computation may be processed (e.g., preprocessed) by the CSD 900 prior to transfer of the data to the processing element 110. For example, data to be used by the processing element 110 may be stored in the NVM 306 according to one format that may not be compatible with the format used by the processing element 110. In this case, the host 110 may invoke the CSD 900 to process the data to change the format of the data to the format used by the processing element 110.

In some embodiments, the host 100 populates the CSD 900 by transmitting a read command or request 902 to the CSD. The read command 902 may be received via a host interface similar to the host interface 308 of FIG. 3. The read command 902 may identify a memory address in the local memory of the CSD 900, as the target address for returning the read data. In some embodiments, a storage controller (similar to the storage controller 309) may process the read command 902 and retrieve the requested data from an NVM (similar to the NVM 306) via an NVM management interface (similar to the NVM management interface 310).

Based on the completion of the read command, the CSD 900 may transmit an acknowledgement message 904 to the host 100, similar to the acknowledgement message 704 of FIG. 7, for indicating completion of the read command.

The completion of the read command may trigger the host 100 to transmit a CSD processing message 906 to the CSD 900. The CSD processing message 906 may cause the CSD 900 to engage in the requested processing of the data stored in the local memory, resulting in a transformed or processed data.

An acknowledgment message 908, similar to the acknowledgment message 904 may be transmitted to the host 100 for indicating the CSD processing is complete. The processed data may now be ready to the transmitted to the processing element 110. In some embodiments, the host 100 transmits a write command or request 910 to the CSD 900. In some embodiments, the source address of the write command is the address in the local memory of the CSD 900 where the processed data is stored, and the target address of the write command is the memory address of the processing element 110.

The CSD 900 may receive the write command 910 via a host interface similar to the host interface 308 of FIG. 3. The CSD 900 (e.g., a storage controller similar to the storage controller 309 of FIG. 3) may process the write command 910 and retrieve the processed data from the local memory of the CSD 900, and provide the data to, for example, a network interface similar to the network interface 312 of FIG. 3. The network interface may prepare a data packet 912 for transmitting the data packet to the processing element 110. The data packet 912 may identify, among other things, a memory address of the processing element 110 where the processed data is to be written. The data packet 912 may be transmitted to the data communication network 114 via the network interface. The data communications network 114 may route the data packet 912 to the processing element 110 based on the memory address identified in the data packet.

Based on the transfer of the data over the data communication 114 (e.g., without an indication of error messages), the CSD 900 may transmit an acknowledgement message 914 to the host 100. The acknowledgement message may be, for example, a completion message that is stored in a completion queue of the host 100. The completion message may be transmitted, for example, via a host interface similar to the host interface 308 of FIG. 3. The completion message may indicate completion of the write command 910.

The acknowledgment message 914 may signal the host 100 that processing of the data may be performed by the processing element 110. In this regard, the host 100 may transmit a processing message 916 to the processing element 110 to begin processing of the data. In some embodiments, the processing message 916 includes the memory address of the processing element 110 storing the data that is the subject of the processing. The processing element 110 may perform a local read of the data at the memory address, and engage in the processing (e.g., a computation) using the data.

Figure 10:
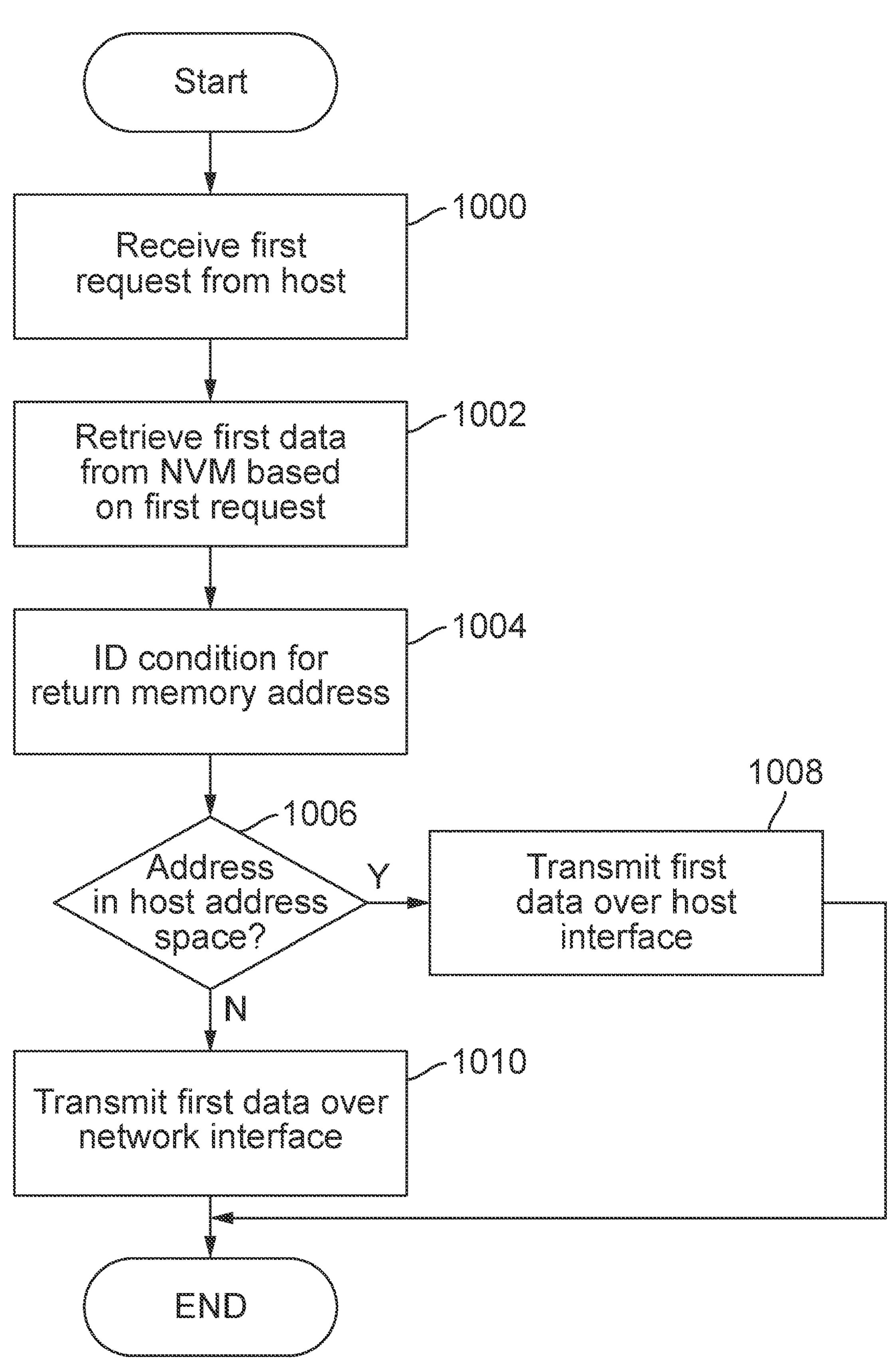
FIG. 10 depicts a flow diagram of a process for moving data stored in a storage device, to a processing element, via a direct memory access according to one or more embodiments.

FIG. 10 depicts a flow diagram of a process for moving data stored in the storage device 300, to a processing element 110, via a direct memory access according to one or more embodiments. The process starts, and in act 1000, the storage device 300 (e.g., the storage controller 309) receives a first request from the host 100 (also referred to as a computing device) via the host interface 308 (also referred to as a first interface). The first request may be, for example, a read command. The request may be retrieved by the storage controller 309 from a submission queue maintained, for example, in the host memory 108. In some embodiments, the first request identifies the data to be read (e.g., a logical block address (LBA) of the data to be read), and a target address (also referred to as a return address or a first memory address) associated with a memory in the processing element 110. The target address may identify a PRP or SGL list in the processing element 110.

In act 1002, the storage controller 309 retrieves the first data from the NVM 306 based on the first request (e.g., based on the LBA included in the first request). In some embodiments, the storage controller 309 interacts with the NVM interface 310 for retrieving the first data. In this regard, the NVM interface 310 may translate the LBA of the first data, to a corresponding NVM location (e.g., a flash address).

In act 1004, the DMA engine 314 may identify a condition associated with the return address (e.g., the first memory address). For example, the DMA engine 314 may examine an identifier bit of the first request (e.g., the least significant bits of the first memory address), for determining whether the identifier bit is set or unset. For example, the identifier bit may be set if the target address is mapped to the network address space, and unset if the target address is mapped to the host memory 108 (or vice versa).

In other examples, the DMA engine 314 may compare the first memory address against a list of saved addresses for determining a match. In this regard, the host 100 provides to the storage device 102, a defined list of addresses and sizes that are part of the network address space. The defined list of addresses may be stored, for example, in memory (not shown) of the storage device 300. The DMA engine 314 may conclude that the target address is part of the network address space upon finding a match in the list of stored addresses.

In act 1006, a determination is made as to whether the condition indicates that the first memory address is in the host address space or in the network address space. For example, the first memory address may be deemed to be in the network address space if the identifier bit is set, or if the first memory address is included in the list of saved addresses.

If the first memory address is in the host address space, the first data may be returned, in act 1008, to the host 100, via the host interface 308 (e.g., via a direct memory access of the host memory 108). The returned data may be stored in an address of the host 100 identified by one or more PRP/SGL entries.

If the first memory address is not in the host address space, the address may be deemed to be in the network address space. In this case, the first data may be transmitted to the processing element 110 over the network interface 312 via the data communications network 114. The network interface 312 may provide access to the mesh network for providing the data to the one of the processing elements 110, using a point-to-point connection. In some embodiments, the network interface 312 is configured to enable a direct memory access of the memory of the processing element 110 for storing the data in the memory of the processing element (e.g., as identified in the PRP/SGL entries).

Figure 11:
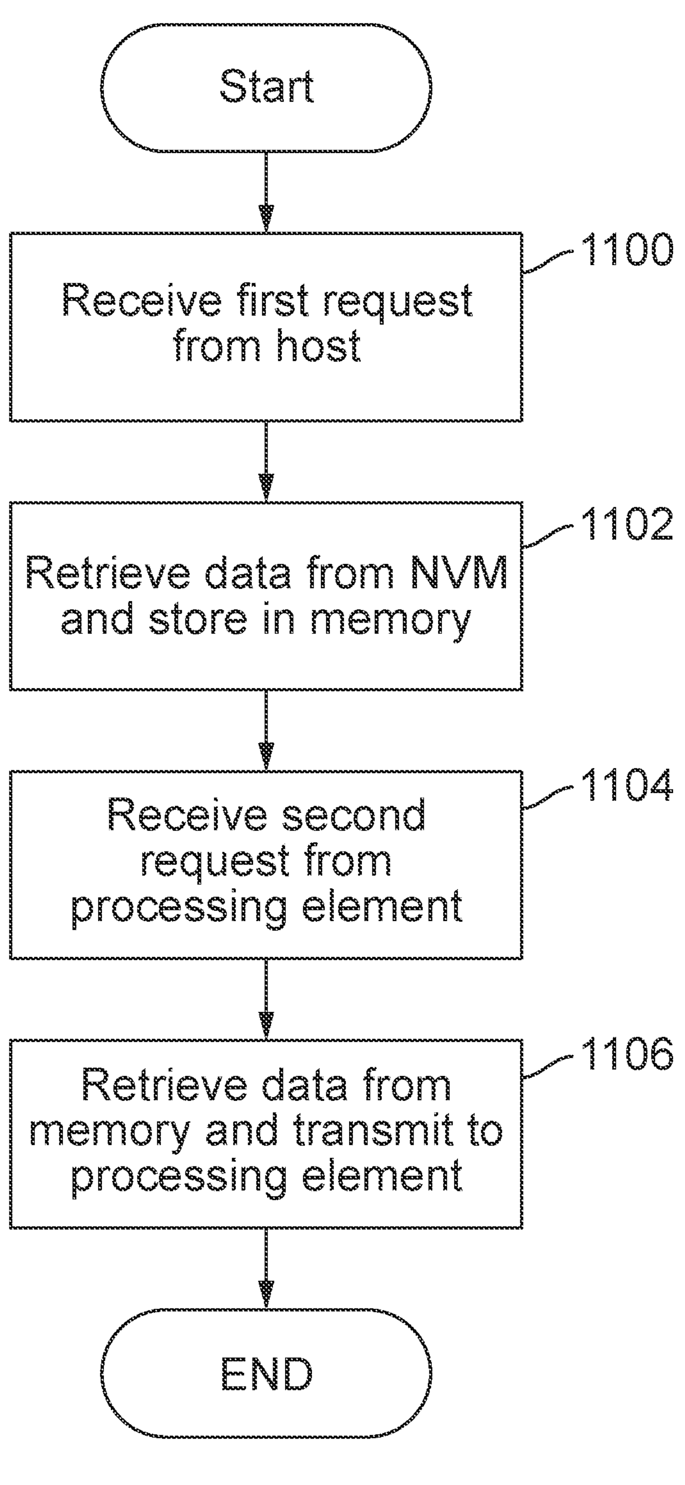
FIG. 11 depicts a flow diagram of a process for moving data stored in a storage device, to a processing element, by exposing memory of the storage device, according to one or more embodiments.

FIG. 11 depicts a flow diagram of a process for moving data stored in the storage device 400, to a processing element 110, by exposing the memory 414 of the storage device, according to one or more embodiments. The process starts, and in act 1100, the storage device 400 (e.g., the storage controller 409) receives a first request from the host 100 (also referred to as a computing device) via the host interface 408 (also referred to as a first interface). The first request may be, for example, a read command. The read command may be placed by an application running on the host 100, into a submission queue, and retrieved by the storage controller 409 for fulfilling the request. In some embodiments, the first request identifies the data to be read (e.g., a logical block address (LBA) of the data to be read), and a target address (also referred to as a return address or a memory address) associated with the memory 414 in the storage device 400.

In act 1102, the storage controller 409 retrieves the data from the NVM 406 based on the first request (e.g., based on the LBA included in the first request). In some embodiments, the storage controller 409 interacts with the NVM interface 410 for retrieving the data. In this regard, the NVM interface 410 may translate the LBA of the data, to a corresponding NVM location (e.g., a flash address). The retrieved data may be stored in the memory 414 based on the target address. In some embodiments, the storage controller 409 transmits a completion message to the completion queue associated with the submission queue where the read command was submitted.

In act 1104, the storage controller 409 receives a second request from the processing element 110. For example, the processing element 110 may transmit the second request in response to a third request from the host 100. The third request may be for performing a computation using the data. The second request may be received over the network interface 412. The second request may identify the memory address in the memory 414 storing the data. In some embodiments the second request is a memory read request similar to a read request transmitted from one processing element 110 (e.g., GPU) to another processing element over the data communications network 114 (e.g., the NVLink network).

In act 1106, the network interface 412 retrieves the data from the memory 414, and transmits the retrieved data to the requesting processing element 110 over the data communications network 114.

One or more embodiments of the present disclosure may be implemented in one or more processors (also referred to as processing circuits). The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for moving data between a storage device and a processing element have been specifically described and illustrated herein, many modifications and variations will be apparent to those skilled in the art. Accordingly, it is to be understood that systems and methods for moving data between a storage device and a processing element constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1: A storage device comprising: a non-volatile storage medium; a first interface for communicating with a computing device; a second interface for communicating with a processing element over a data communications network, the processing element including a first memory; and a processing circuit coupled to the first interface, the second interface, and the non-volatile storage medium, the processing circuit being configured to: receive a first request from the computing device via the first interface, the first request identifying a first memory address associated with the first memory; retrieve first data from the non-volatile storage medium based on the first request; and transmit the first data to the processing element via the second interface for storing the first data in the first memory based on the first memory address.

Statement 2. The storage device of Statement 1, wherein the first interface is configured for communication with the computing device over a data communication bus.

Statement 3. The storage device of Statement 1, wherein the second interface is configured for point-to-point communication with the processing element over the data communications network.

Statement 4. The storage device of Statement 3, wherein the data communications network includes a switch for transmitting the first data to the processing element based on the first memory address.

Statement 5. The storage device of Statement 1, wherein the processing element includes a graphics processing unit (GPU).

Statement 6. The storage device of Statement 1, wherein the processing circuit is further configured to transmit the first data to the processing element based on identifying a condition associated with the first memory address.

Statement 7. The storage device of Statement 1 further comprising a second memory, wherein the processing circuit is further configured to: receive a second request from the computing device via the first interface; process second data based on the second request for generating processed second data; store the processed second data in the second memory; receive a third request from the computing device via the first interface, the third request identifying a second memory address associated with the second memory; and transmit the processed second data to the processing element via the second interface for storing the second data in the first memory based on the second memory address.

Statement 8. A storage device comprising: a non-volatile storage medium; a memory; a first interface for communicating with a computing device; a second interface for communicating with a processing element over a data communications network; and a processing circuit coupled to the first interface, the second interface, the non-volatile storage medium, and the memory, the processing circuit being configured to: receive a first request from the computing device via the first interface, the first request identifying a memory address associated with the memory; retrieve data from the non-volatile storage medium based on the first request, and store the data in the memory based on the memory address; receive a second request from the processing element over the second interface, the second request identifying the memory address storing the data; and based on the second request, retrieve the data from the memory and transmit the data to the processing element over the data communications network.

Statement 9. The storage device of Statement 8, wherein the memory is exposed to the data communications network via the second interface.

Statement 10. The storage device of Statement 8, wherein the first request is a first read request and the second request is a second read request.

Statement 11. The storage device of Statement 8, wherein the first interface is configured for communication with the computing device over a data communication bus.

Statement 12. The storage device of Statement 8, wherein the second interface is configured for point-to-point communication with the processing element over the data communications network.

Statement 13. The storage device of claim 12, wherein the data communications network includes a switch for transmitting the data to the processing element based on the memory address.

Statement 14. The storage device of Statement 8, wherein the processing element includes a graphics processing unit (GPU).

Statement 15. The storage device of Statement 8, wherein the processing circuit is configured to transmit the second request in response to a third request received by the processing circuit from the computing device, wherein the third request is for performing a computation using the data.

Statement 16. A method comprising: receiving a first request from a computing device via a first interface of a storage device, the first request identifying a first memory address associated with a first memory of a processing element; retrieving first data from a non-volatile storage medium of the storage device based on the first request; and transmitting the first data to the processing element via a second interface of the storage device, for storing the first data in the first memory based on the first memory address.

Statement 17. The method of Statement 16, wherein the first interface communicates with the computing device over a data communication bus.

Statement 18. The method of Statement 16, wherein the second interface engages in point-to-point communication with the processing element over a data communications network.

Statement 19. The method of Statement 16 further comprising: transmitting the first data to the processing element based on identifying a condition associated with the first memory address.

Statement 20. The method of Statement 16 further comprising: receiving a second request from the computing device via the first interface; processing second data based on the second request for generating processed second data; storing the processed second data in a second memory of the storage device; receiving a third request from the computing device via the first interface, the third request identifying a second memory address associated with the second memory; and transmitting the processed second data to the processing element via the second interface for storing the second data in the first memory based on the second memory address.

What is claimed is:

1. A storage device comprising:

a non-volatile storage medium;

a first interface for communicating with a computing device based on a first interface protocol;

a second interface for communicating with a processing element over a data communications network based on a second interface protocol different from the first interface protocol, wherein the second interface is for accessing a network of processing elements including the processing element, the processing element including a first memory; and a processing circuit coupled to the first interface, the second interface, and the non-volatile storage medium, the processing circuit being configured to:

receive a first request from the computing device via the first interface, the first request identifying a first memory address associated with the first memory;

retrieve first data from the non-volatile storage medium based on the first request; and transmit the first data to the processing element via the second interface for storing the first data in the first memory based on determining that a condition associated with the first memory address indicates that the first memory address is in an address space associated with the processing element.

2. The storage device of claim 1, wherein the first interface is configured for communication with the computing device over a data communication bus.

3. The storage device of claim 1, wherein the second interface is configured for point-to-point communication with the processing element over the data communications network.

4. The storage device of claim 3, wherein the data communications network includes a switch for transmitting the first data to the processing element based on the first memory address.

5. The storage device of claim 1, wherein the processing element includes a graphics processing unit (GPU).

6. The storage device of claim 1 further comprising a second memory, wherein the processing circuit is further configured to:

receive a second request from the computing device via the first interface;

process second data based on the second request for generating processed second data;

store the processed second data in the second memory;

receive a third request from the computing device via the first interface, the third request identifying a second memory address associated with the second memory; and transmit the processed second data to the processing element via the second interface for storing the processed second data in the first memory based on the second memory address.

7. A storage device comprising:

a non-volatile storage medium;

a memory;

a first interface for communicating with a computing device, wherein the first interface is associated with a first interface protocol;

a second interface for communicating with a processing element over a data communications network, wherein the second interface is associated with a second interface protocol different from the first interface protocol, wherein the second interface is for accessing a network of processing elements including the processing element; and a processing circuit coupled to the first interface, the second interface, the non-volatile storage medium, and the memory, the processing circuit being configured to:

receive a first request from the computing device via the first interface, the first request identifying a memory address associated with the memory;

retrieve data from the non-volatile storage medium based on the first request, and store the data in the memory identified by the memory address;

receive a second request from the processing element over the second interface, the second request identifying the memory address storing the data; and based on the second request, retrieve the data from the memory and transmit the data to the processing element over the data communications network.

8. The storage device of claim 7, wherein the memory is exposed to the data communications network via the second interface.

9. The storage device of claim 7, wherein the first request is a first read request and the second request is a second read request.

10. The storage device of claim 7, wherein the first interface is configured for communication with the computing device over a data communication bus.

11. The storage device of claim 7, wherein the second interface is configured for point-to-point communication with the processing element over the data communications network.

12. The storage device of claim 11, wherein the data communications network includes a switch for transmitting the data to the processing element based on the memory address.

13. The storage device of claim 7, wherein the processing element includes a graphics processing unit (GPU).

14. The storage device of claim 7, wherein the processing element is configured to transmit the second request in response to a third request received by the processing element from the computing device, wherein the third request is for performing a computation using the data.

15. A method comprising:
- receiving a first request from a computing device via a first interface of a storage device, the first interface being associated with a first interface protocol, the first request identifying a first memory address associated with a first memory of a processing element;
- retrieving first data from a non-volatile storage medium of the storage device based on the first request; and
- transmitting the first data to the processing element via a second interface of the storage device, for storing the first data in the first memory based on determining that a condition associated with the first memory address indicates that the first memory address is in an address space associated with the processing element, wherein the second interface is associated with a second interface protocol different from the first interface protocol, wherein the second interface is for accessing a network of processing elements including the processing element.

16. The method of claim 15, wherein the first interface communicates with the computing device over a data communication bus.

17. The method of claim 15, wherein the second interface engages in point-to-point communication with the processing element over a data communications network.

18. The method of claim 15 further comprising:
- receiving a second request from the computing device via the first interface;
- processing second data based on the second request for generating processed second data;
- storing the processed second data in a second memory of the storage device;
- receiving a third request from the computing device via the first interface, the third request identifying a second memory address associated with the second memory; and
- transmitting the processed second data to the processing element via the second interface for storing the processed second data in the first memory based on the second memory address.

* * * * *